(12) United States Patent
Clemen et al.

(10) Patent No.: US 10,041,415 B2
(45) Date of Patent: Aug. 7, 2018

(54) BURNER SEAL FOR GAS-TURBINE COMBUSTION CHAMBER HEAD AND HEAT SHIELD

(71) Applicant: Rolls-Royce Deutschland Ltd & Co KG, Blankenfelde-Mahlow (DE)

(72) Inventors: Carsten Clemen, Mittenwalde (DE); Michael Ebel, Rangsdorf (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 848 days.

(21) Appl. No.: 14/264,965

(22) Filed: Apr. 29, 2014

(65) Prior Publication Data
US 2014/0318148 A1 Oct. 30, 2014

(30) Foreign Application Priority Data
Apr. 30, 2013 (DE) .................... 10 2013 007 443

(51) Int. Cl.
*F02C 7/28* (2006.01)
*F02C 7/20* (2006.01)
(Continued)

(52) U.S. Cl.
CPC ............... *F02C 7/28* (2013.01); *F23R 3/283* (2013.01); *F23R 3/60* (2013.01); *F01D 9/023* (2013.01);
(Continued)

(58) Field of Classification Search
CPC .... F02C 7/28; F02C 7/20; F23R 3/002; F23R 3/60; F01D 9/023
(Continued)

(56) References Cited

U.S. PATENT DOCUMENTS 3,226,168 A * 12/1965 Recknagel .......... F16C 33/7856
277/551
3,759,038 A * 9/1973 Scalzo .................... F01D 9/023
415/117
(Continued)

FOREIGN PATENT DOCUMENTS

DE 3224563 2/1983
DE 4427222 2/1996
(Continued)

OTHER PUBLICATIONS

German Search Report dated Feb. 17, 2014 from counterpart App No. 10 2013 007 443.6.
(Continued)

*Primary Examiner* — Lorne Meade
*Assistant Examiner* — Eric Linderman
(74) *Attorney, Agent, or Firm* — Shuttleworth & Ingersoll, PLC; Timothy Klima

(57) ABSTRACT

The present invention relates to a combustion chamber for a gas turbine with a combustion chamber head and a heat shield which are designed in one piece, with the heat shield being provided with at least one recess, in which is arranged a burner or an annular sleeve enclosing the burner, with a burner seal being provided between the heat shield and the burner, characterized in that the heat shield is provided in the area of the recess with an annular groove, in which is arranged at least one elastic sealing element forming the burner seal.

7 Claims, 4 Drawing Sheets

Figure 1:
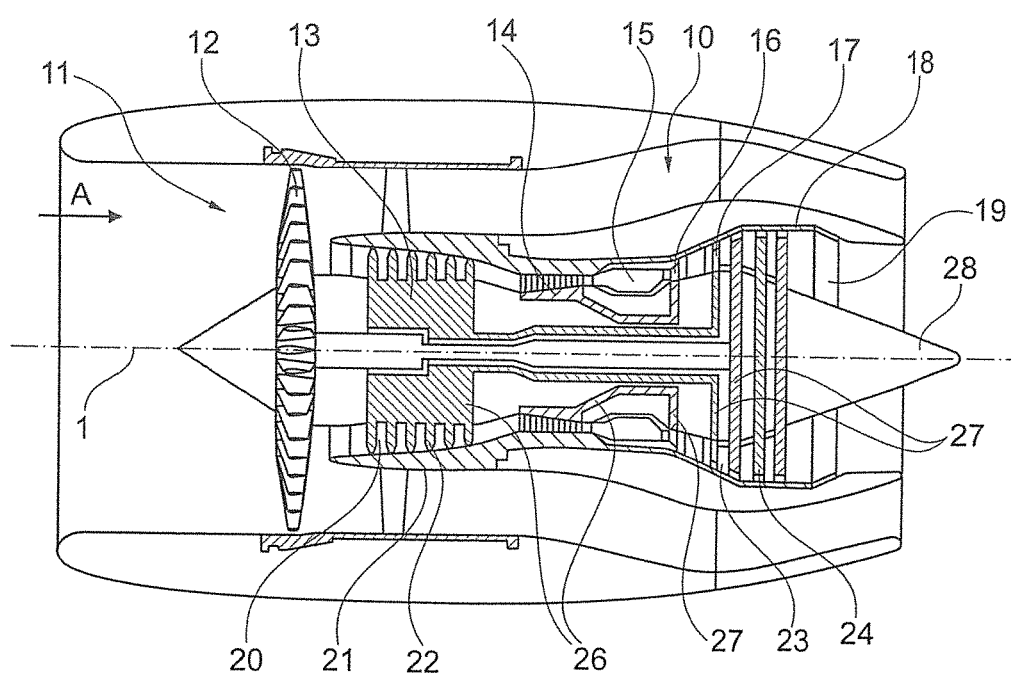

(51) Int. Cl.
*F23R 3/60* (2006.01)
*F23R 3/28* (2006.01)
*F23R 3/00* (2006.01)
*F01D 9/02* (2006.01)

(52) U.S. Cl.
CPC .............. *F02C 7/20* (2013.01); *F23R 3/002* (2013.01); *F23R 2900/00012* (2013.01)

(58) Field of Classification Search
USPC .................... 60/752, 796, 799; 29/889.2
See application file for complete search history.

(56) References Cited

U.S. PATENT DOCUMENTS

| | | | | |
|---|---|---|---|---|
| 4,192,051 | A * | 3/1980 | Bergeron | B23P 15/08 277/463 |
| 4,232,527 | A * | 11/1980 | Reider | F23R 3/08 60/754 |
| 4,271,675 | A * | 6/1981 | Jones | F23R 3/14 239/406 |
| 4,333,661 | A * | 6/1982 | Merrell | F02G 1/0445 277/458 |
| 4,606,190 | A | 8/1986 | Greene et al. | |
| 4,686,823 | A * | 8/1987 | Coburn | F23R 3/283 60/740 |
| 5,106,129 | A * | 4/1992 | Camacho | F16L 27/12 277/616 |
| 5,222,358 | A * | 6/1993 | Chaput | F23R 3/283 60/740 |
| 5,253,471 | A * | 10/1993 | Richardson | F23R 3/10 60/754 |
| 5,265,890 | A * | 11/1993 | Balsells | F16F 3/12 277/467 |
| 5,524,438 | A * | 6/1996 | Johnson | F23R 3/10 60/747 |
| 5,809,820 | A * | 9/1998 | Morimoto | B21D 53/20 470/41 |
| 5,894,732 | A * | 4/1999 | Kwan | F23R 3/283 60/748 |
| 5,934,066 | A * | 8/1999 | Schmid | F23R 3/002 60/752 |
| 5,956,955 | A * | 9/1999 | Schmid | F23R 3/10 60/748 |
| 6,397,603 | B1 | 6/2002 | Edmondson et al. | |
| 6,679,063 | B2 * | 1/2004 | Ebel | F23R 3/10 60/747 |
| 6,687,130 | B2 * | 2/2004 | Adams, Sr. | H05K 7/1442 361/174 |
| 6,709,024 | B1 * | 3/2004 | Swinford | F16L 27/026 285/233 |
| 7,681,398 | B2 * | 3/2010 | Patel | F02C 3/145 60/752 |
| 7,775,051 | B2 * | 8/2010 | Hernandez | F23R 3/60 60/748 |
| 7,788,929 | B2 * | 9/2010 | Biebel | F23R 3/283 60/752 |
| 7,908,866 | B2 | 3/2011 | Kato et al. | |
| 7,938,407 | B2 * | 5/2011 | Datta | F16J 15/0887 277/644 |
| 8,215,115 | B2 | 7/2012 | Adair et al. | |
| 8,413,447 | B2 | 4/2013 | Cihlar | |
| 8,490,401 | B2 * | 7/2013 | Commaret | F23R 3/283 60/742 |
| 8,701,417 | B2 * | 4/2014 | Nicholls | F23R 3/10 60/756 |
| 8,756,935 | B2 * | 6/2014 | Duval | F23R 3/283 60/752 |
| 8,769,963 | B2 * | 7/2014 | Ryan | F01D 9/023 60/752 |
| 9,121,609 | B2 * | 9/2015 | Barton | F23R 3/04 |
| 9,357,684 | B2 * | 5/2016 | Foster | F01D 25/246 |
| 2002/0064455 | A1 * | 5/2002 | Toffan | F01D 11/003 415/170.1 |
| 2003/0122377 | A1 * | 7/2003 | Northrop | F16L 23/08 285/363 |
| 2004/0083735 | A1 * | 5/2004 | Borns | F23R 3/10 60/772 |
| 2005/0058537 | A1 * | 3/2005 | Corman | F01D 11/001 415/139 |
| 2005/0132708 | A1 * | 6/2005 | Martling | F01D 9/023 60/752 |
| 2005/0206097 | A1 * | 9/2005 | Datta | F16J 15/3212 277/644 |
| 2006/0034684 | A1 * | 2/2006 | Metz | F01D 11/003 415/191 |
| 2006/0042268 | A1 * | 3/2006 | Markarian | F23R 3/10 60/796 |
| 2008/0092546 | A1 * | 4/2008 | Stastny | F23R 3/002 60/752 |
| 2008/0104962 | A1 * | 5/2008 | Patel | F23R 3/10 60/752 |
| 2008/0115498 | A1 * | 5/2008 | Patel | F23R 3/10 60/752 |
| 2008/0115499 | A1 * | 5/2008 | Patel | F23R 3/10 60/752 |
| 2008/0236169 | A1 * | 10/2008 | Hawie | F23R 3/002 60/779 |
| 2008/0256955 | A1 * | 10/2008 | Parkman | F23R 3/60 60/752 |
| 2008/0282703 | A1 * | 11/2008 | Morenko | F23R 3/002 60/796 |
| 2009/0000303 | A1 * | 1/2009 | Patel | F23R 3/002 60/752 |
| 2009/0025224 | A1 * | 1/2009 | Patel | B22F 3/22 29/890.142 |
| 2009/0206558 | A1 * | 8/2009 | Nameki | F16J 15/062 277/644 |
| 2010/0102518 | A1 * | 4/2010 | Gao | F16J 15/164 277/554 |
| 2010/0201074 | A1 * | 8/2010 | Haynes | F16J 15/441 277/361 |
| 2010/0242493 | A1 | 9/2010 | Cihlar et al. | |
| 2011/0079962 | A1 * | 4/2011 | Munro | F16J 15/3236 277/500 |
| 2011/0120133 | A1 * | 5/2011 | Rudrapatna | F23R 3/002 60/752 |
| 2011/0182722 | A1 * | 7/2011 | Matsuyama | F01D 11/005 415/174.2 |
| 2012/0240595 | A1 | 9/2012 | Gerendas | |
| 2013/0174562 | A1 * | 7/2013 | Holcomb | F23R 3/002 60/752 |
| 2013/0192233 | A1 * | 8/2013 | Eastwood | F23R 3/002 60/752 |
| 2013/0247575 | A1 * | 9/2013 | Patel | F02C 7/24 60/752 |
| 2014/0007580 | A1 * | 1/2014 | Richardson | F23R 3/02 60/754 |
| 2014/0054862 | A1 * | 2/2014 | Davis | F01D 11/025 277/370 |
| 2014/0056685 | A1 * | 2/2014 | Duelm | F01D 25/08 415/1 |
| 2014/0144148 | A1 * | 5/2014 | Jause | F02C 7/20 60/772 |
| 2014/0318138 | A1 * | 10/2014 | Bunel | F23R 3/283 60/752 |
| 2015/0107109 | A1 * | 4/2015 | Corsmeier | F23R 3/002 29/889.2 |
| 2015/0121880 | A1 * | 5/2015 | Kidder | F02C 3/04 60/726 |
| 2015/0260405 | A1 * | 9/2015 | Clemen | F23R 3/02 60/722 |
| 2015/0345789 | A1 * | 12/2015 | Papple | F23R 3/10 60/772 |
| 2015/0354818 | A1 * | 12/2015 | Lebel | F23R 3/002 60/796 |
| 2016/0040547 | A1 * | 2/2016 | Clouse | F01D 25/246 60/805 |
| 2016/0040886 | A1 * | 2/2016 | Danburg | F01D 9/023 60/752 |

(56) References Cited

U.S. PATENT DOCUMENTS

2016/0061448 A1* 3/2016 Davenport .............. F23R 3/005
                                                        60/754
2016/0153660 A1* 6/2016 Drake ....................... F23R 3/14
                                                        60/748
2016/0223133 A1* 8/2016 Peters .................... F16M 13/02

FOREIGN PATENT DOCUMENTS

| | | | | |
|---|---|---|---|---|
| DE | 10048864 | 4/2002 | | |
| DE | 60122819 | 10/2007 | | |
| DE | 10 2010 037 353 | 3/2011 | | |
| EP | 2503242 | 9/2012 | | |
| EP | 2518408 | 10/2012 | | |
| EP | 2604926 | 6/2013 | | |
| GB | 2102897 | 2/1983 | | |
| GB | 2464467 | 4/2010 | | |
| GB | 2464467 | * 4/2016 | ............... | F16J 15/18 |
| WO | 2006/109431 | 10/2006 | | |

OTHER PUBLICATIONS

European Search Report dated Sep. 22, 2014 from counterpart app No. 14164575.4.

\* cited by examiner

BURNER SEAL FOR GAS-TURBINE COMBUSTION CHAMBER HEAD AND HEAT SHIELD

This application claims priority to German Patent Application DE102013007443.6 filed Apr. 30, 2013, the entirety of which is incorporated by reference herein.

This invention relates to a burner seal for a gas-turbine combustion chamber head and a heat shield thereof.

In detail, the invention relates to a combustion chamber head arrangement of a gas turbine, in which a combustion chamber head and a heat shield are provided which are designed in one piece with each other. The heat shield is provided with at least one recess or passage opening, in which is arranged a burner or an annular sleeve enclosing the burner. A burner seal is provided between the heat shield and the burner.

The state of the art shows various designs, on the one hand to fix the burner inside the recess and on the other hand to ensure a sealing function between the combustion chamber head, the heat shield and the burner. In this connection, reference is made to EP 2 503 242 A2, DE 44 27 222 A1 and DE 100 48 864 A1. The designs are expensive and complicated to produce and assemble, and hence cost-intensive.

The object underlying the present invention is to provide a combustion chamber head for a gas turbine which, while being simply designed and easily and cost-effectively producible, can be assembled with ease and features a high operational reliability.

It is a particular object to provide a solution to the above problems by a combination of features described herein. Further advantageous embodiments will become apparent from the present description.

It is thus provided in accordance with the invention that the heat shield is provided in the area of the recess with an annular groove, in which is arranged an elastic sealing element forming the combustion chamber seal.

An arrangement is thus created in accordance with the invention in which the combustion chamber head and the heat shield are designed in one piece and hence form an integral component that can be manufactured by, for example, additive methods. It is possible here to produce either an integral component extending around the entire circumference of the burner axis or a component joined together from several circumferential segments. The joining methods can for example include welding, bolt connections or the like. The combustion chamber walls of the embodiment in accordance with the invention can be manufactured integrally with the combustion chamber head and the heat shield. Alternatively it is also possible to join them to the combustion chamber head/ heat shield as shown by the state of the art. A one piece unitary and inseparable structure design of the combustion chamber head and the heat shield allows the single piece part to be manufactured in a single process. A single process is cheaper than manufacturing both parts separately and then joining them together, as process steps that had to be taken for each part can now be done at once. Further, in a single process approach, joining surfaces between separate parts don't exist and don't need to be machined prior to joining, which saves further process steps. As there are fewer connections in the assembly, leakage air streams are reduced. A single piece part also allows for reducing design tolerances which saves material and allows the design to be optimized for expected loads, thereby improving mechanical properties and performance. The overall design is thus lighter and cheaper. However, since the combustion chamber head and heat shield are integrally formed, the burner seal cannot be inserted during connecting of both parts.

The heat shield is provided with a recess or passage opening through which the burner can be inserted. Between the burner and the heat shield is arranged the burner seal, which seals off the combustion chamber from the combustion chamber head.

It is provided in accordance with the invention that the combination of combustion chamber head and heat shield is provided with an annular groove in the area of the recess or passage opening for the burner. The annular groove is designed upstream of the recess or passage opening in the heat shield.

In accordance with the invention, an elastic sealing element forming the burner seal is arranged in the annular groove. Unlike in the state of the art, this element is not rigid, but designed similarly to a spring washer. The elastic sealing element can thus be flexibly compressed for insertion into the groove. Inside the groove, the elastic sealing element relaxes back to its original size and thus adopts a firm seat inside the groove, so that on the one hand fixing of the burner inside the heat shield and on the other hand the sealing function are assured.

The elastic sealing element (the burner seal) preferably has an outer diameter which is smaller than the outer diameter of the groove, which is however greater than the diameter of the recess. It is thus prevented from slipping forwards out of the groove into the combustion chamber, while at the same time sufficient clearance is provided to compensate for thermal expansions and contractions. It is preferably furthermore provided in a favourable development that the axial length of the groove is larger than the axial width of the burner seal or of the elastic sealing element. This also provides a sufficient clearance to allow for compensation of thermal influences.

It is thus possible in accordance with the invention to insert the elastic sealing element into the groove due to its elastic deformation. In the same way, the elastic sealing element can be removed again for disassembly. The elastic sealing element in accordance with the invention can thus be used several times and is wear-proof.

In a particularly favourable embodiment of the invention, it is possible to provide effusion cooling holes both in the heat shield and in the burner seal (in the elastic sealing element).

The elastic sealing element in accordance with the invention can be designed as a spring washer, and in particular also in spiral form, like a key ring.

Within the framework of the invention, several such elastic sealing elements can also be arranged in the groove. As a result, it is possible to fix and seal the burner or an associated component in which an annular sleeve is provided in the axial direction in both senses.

In a modification of the invention, it is also possible to provide the annular groove not inside the wall area of the recess or not only therein, but alternatively also on the outer circumference of the burner or of a sleeve associated with the burner. Here too, the elastic sealing element snaps into the groove after assembly and is fixed there.

Figure 2:
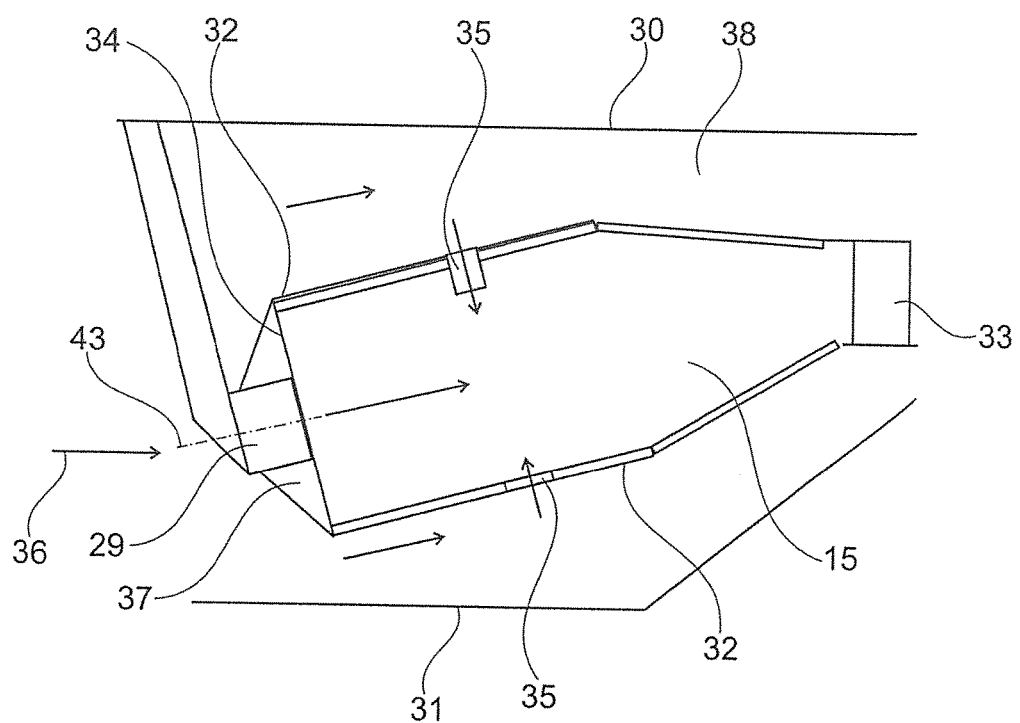
Figure 3:
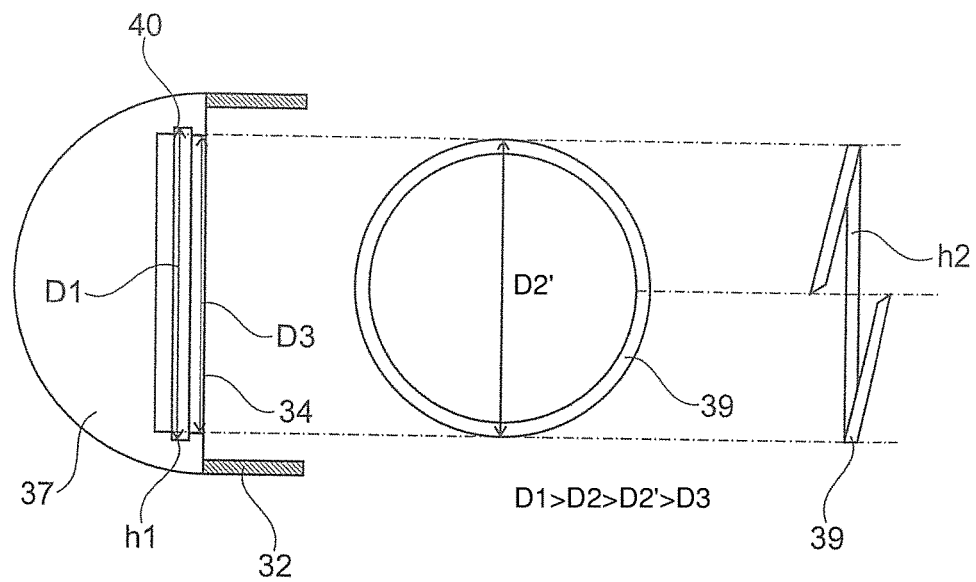
Figure 4:
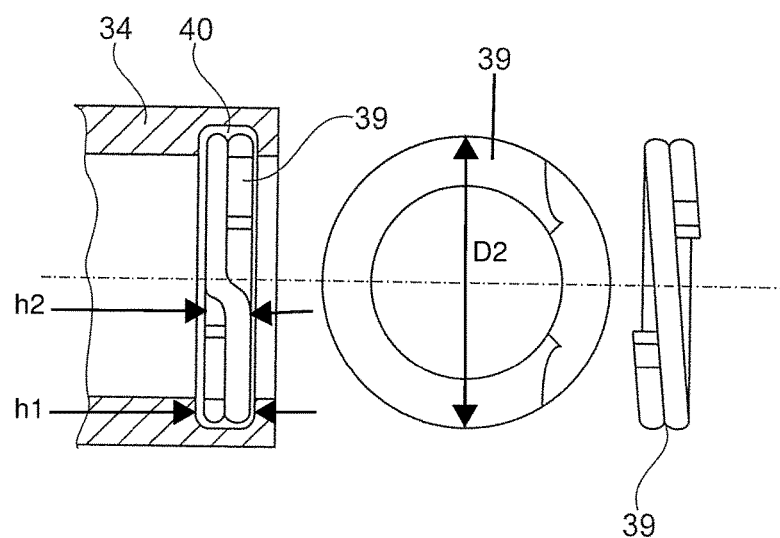
Figure 5:
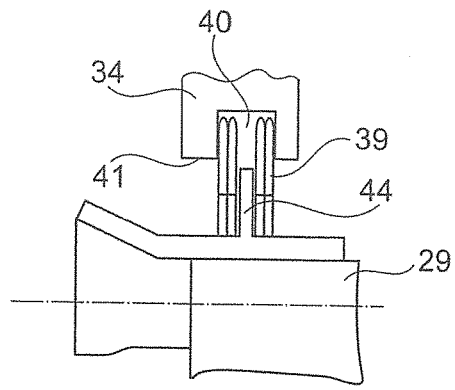
Figure 6:
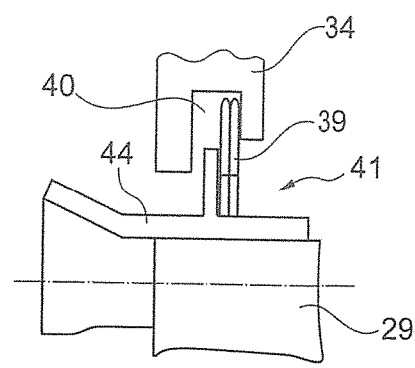
Figure 7:
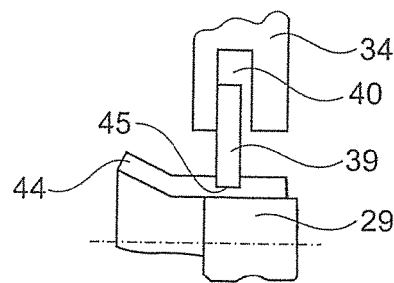
Figure 8:
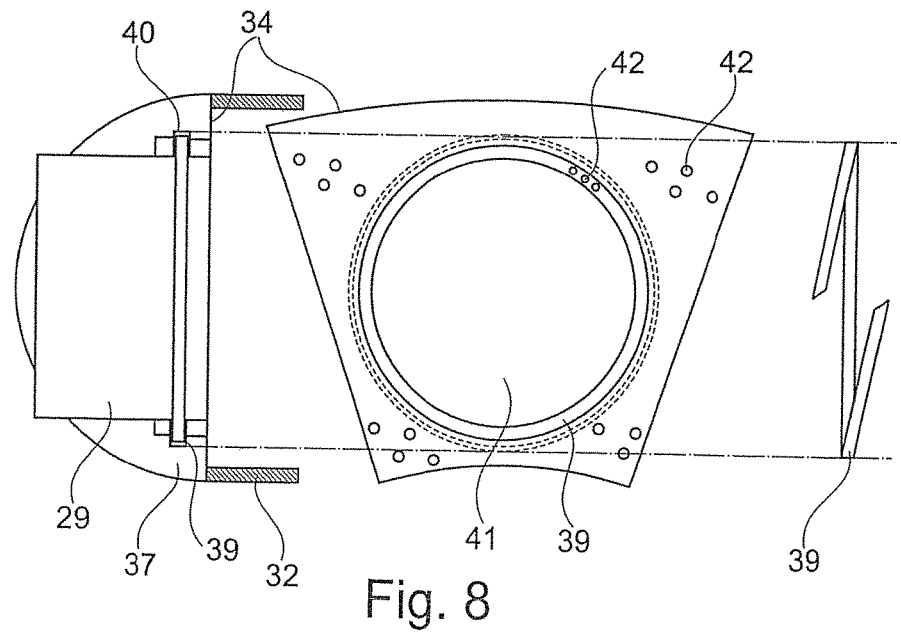

The present invention is described in the following in light of the accompanying drawing, showing exemplary embodiments. In the drawing, FIG. 1 shows a schematic representation of a gas-turbine engine in accordance with the present invention, FIG. 2 shows a schematic representation of a combustion chamber in accordance with the present invention, FIG. 3 shows an enlarged schematic detail view of the combustion chamber head with heat shield and the elastic sealing element in accordance with the present invention, FIG. 4 shows a further exemplary embodiment in analogeous representation to FIG. 3, FIG. 5 shows a simplified sectional view of an exemplary embodiment using two elastic sealing elements, FIG. 6 shows a representation of a further exemplary embodiment, similarly to FIG. 5, FIG. 7 shows a further simplified detail representation of an exemplary embodiment, and FIG. 8 shows a further exemplary embodiment in accordance with the present invention in analogeous representation to FIG. 3.

The gas-turbine engine 10 in accordance with FIG. 1 is a generally represented example of a turbomachine where the invention can be used. The engine 10 is of conventional design and includes in the flow direction, one behind the other, an air inlet 11, a fan 12 rotating inside a casing, an intermediate-pressure compressor 13 a high-pressure compressor 14, a combustion chamber 15, a high-pressure turbine 16, an intermediate-pressure turbine 17 and a low-pressure turbine 18 as well as an exhaust nozzle 19, all of which being arranged about a center engine axis 1.

The intermediate-pressure compressor 13 and the high-pressure compressor 14 each include several stages, of which each has an arrangement extending in the circumferential direction of fixed and stationary guide vanes, generally referred to as stator vanes 20 and projecting radially inwards from the engine casing 21 in an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation.

FIG. 2 shows a schematic representation of a combustion chamber in accordance with the present invention. The latter includes a burner 29 (fuel nozzle), a combustion chamber outer casing 30 and a combustion chamber inner casing 31. Reference numeral 32 indicates a combustion chamber wall. The inner volume of the combustion chamber 15 opens to a schematically illustrated turbine inlet guide vane row 33.

A heat shield 34 is provided at the intake area of the combustion chamber. The inflow direction of the air is indicated by the arrow 36. Admixing holes 35 are provided in the combustion chamber wall 32. A combustion chamber head 37 is connected in one piece to the heat shield 34. A recess 41 (heat shield passage) is provided in the heat shield, through which recess the burner 29 is passed, and is sealed by means of a burner seal 39 (sealing element).

FIG. 3 shows a first schematically illustrated exemplary embodiment. It can be seen that in accordance with the invention, a groove 40 (annular groove) is provided, in which is arranged an elastic sealing element 39. The latter is, as shown in the middle part of the illustration in FIG. 3, annular and, as shown in the right-hand half of FIG. 3, designed spiral or as a spring washer. The elastic sealing element 39 can thus be inserted into the annular groove 40 by altering its diameter or by turning it in the circumferential direction. The annular groove 40 has a diameter D1 which is greater than the outer diameter D2 (FIG. 4) of the elastic sealing element in the relaxed non-deformed state. The recess 41 of the heat shield 34 has an inner diameter D3 which is smaller than the outer diameter D2 of the sealing element 39 but larger than an outer diameter D2' (FIG. 3) of the sealing element 39 in a radially compressed state. The axial width h1 of the annular groove 40 is greater than the axial width h2 of the sealing element 39.

FIG. 4 shows a modified exemplary embodiment in which the elastic sealing element 39 includes several coils of a spring and is designed in the form of a key ring.

FIGS. 5 and 6 show exemplary embodiments in which the burner 29 is arranged in an annular sleeve 44 whose outer diameter is greater than the free inner diameter of the elastic sealing element 39. The burner is located inside the annular sleeve 44 and does not form a material unit with the latter. FIG. 5 shows an exemplary embodiment in which two elastic sealing elements 39 are provided which effect, additionally to the sealing function, axial securing of the annular sleeve 44. In the exemplary embodiment in FIG. 6, the recess 41 is provided in the axial direction with different diameters, so that the annular sleeve 44 can be brought into contact with a wall of the annular groove 40. Only one elastic sealing element 39 is required for securing and sealing.

FIG. 7 shows a modified exemplary embodiment in which the elastic sealing element 39, which is designed as a spring washer or key ring, engages both in the annular groove 40 of the heat shield 34 and in a further annular groove 45 of the annular sleeve 44. Here too, the burner 29 is located inside the annular sleeve 44 and does not form a material unit with the annular sleeve 44.

FIG. 8 shows an exemplary embodiment in which effusion cooling holes 42 are provided both on the heat shield 34 and on the elastic sealing element 39. The sealing element 39/ sealing ring here also assumes the function of the annular sleeve 44, meaning that an axial displacement of the burner 29 relative to the sealing element 39 is permitted, a function which must be provided as a general principle in a burner/combustion chamber interface.

LIST OF REFERENCE NUMERALS

1 Engine axis
10 Gas-turbine engine/core engine
11 Air inlet
12 Fan
13 Intermediate-pressure compressor (compressor)
14 High-pressure compressor
15 Combustion chambers
16 High-pressure turbine
17 Intermediate-pressure turbine
18 Low-pressure turbine
19 Exhaust nozzle
20 Stator vanes
21 Engine casing
22 Compressor rotor blades
23 Stator vanes
24 Turbine blades
26 Compressor drum or disk
27 Turbine rotor hub
28 Exhaust cone
29 Fuel nozzle/burner
30 Combustion chamber outer casing
31 Combustion chamber inner casing 32 Combustion chamber wall
33 Turbine inlet guide vane row
34 Heat shield
35 Admixing hole
36 Inflow direction
37 Combustion chamber head
38 Annular duct/annulus
39 Burner seal/sealing element
40 Annular groove
41 Heat shield passage/recess
42 Effusion hole
43 Burner axis
44 Annular sleeve
45 Annular groove

What is claimed is:

1. A combustion chamber for a gas turbine comprising:
a combustion chamber head and a heat shield which are configured as one piece,
wherein the heat shield includes a recess,
a burner arranged in the recess,
a burner seal provided between the heat shield and the burner,
wherein the heat shield includes, in an area of the recess, a first annular groove, the first annular groove having a radially outer portion forming an outer diameter greater than an inner diameter of the recess, the first annular groove having a first side portion and a second side portion axially spaced apart from the first side portion, each of the first side portion and the second side portion extending between the outer diameter and the inner diameter of the recess, the first annular groove being defined between the first side portion, the radially outer portion and the second side portion, wherein the first side portion, the radially outer portion and the second side portion are formed as a one piece unitary and inseparable structure,
an elastic sealing element including an outer circumference arranged in the first annular groove forming the burner seal,
the elastic sealing element being elastically compressible in a radially inwardly direction, the elastic sealing element having a first outer diameter in a relaxed state and a second outer diameter in a radially compressed state, with the first outer diameter being greater than the second outer diameter, the first outer diameter of the elastic sealing element being greater than the inner diameter of the recess and the second outer diameter being less than the inner diameter of the recess;
an annular sleeve surrounding the burner, the annular sleeve including, in an area of the recess, a second annular groove being axially aligned with the first annular groove,
wherein the elastic sealing element includes an inner circumference arranged in the second annular groove; and
wherein the elastic sealing element is a spring.

2. The combustion chamber in accordance with claim 1, wherein the elastic sealing element is substantially annular.

3. The combustion chamber in accordance with claim 1, wherein the outer diameter of the first annular groove is greater than the first outer diameter of the elastic sealing element.

4. The combustion chamber in accordance with claim 1, wherein the spring is a helical spring.

5. The combustion chamber in accordance with claim 1, wherein the spring is a spring washer.

6. The combustion chamber in accordance with claim 1, wherein the spring includes effusion cooling holes.

7. The combustion chamber in accordance with claim 1, wherein an axial width of the first annular groove is larger than an axial width of the elastic sealing element.

* * * * *